United States Patent
Higashi

(10) Patent No.: US 9,786,927 B2
(45) Date of Patent: Oct. 10, 2017

(54) CONDUCTIVE MEMBER, CELL STACK, ELECTROCHEMICAL MODULE, AND ELECTROCHEMICAL DEVICE

(71) Applicant: KYOCERA Corporation, Kyoto-shi, Kyoto (JP)

(72) Inventor: Masahiko Higashi, Kirishima (JP)

(73) Assignee: Kyocera Corporation, Kyoto-shi, Kyoto (JP)

(*) Notice: Subject to any disclaimer, the term of this patent is extended or adjusted under 35 U.S.C. 154(b) by 424 days.

(21) Appl. No.: 14/401,535

(22) PCT Filed: May 17, 2013

(86) PCT No.: PCT/JP2013/063796
§ 371 (c)(1),
(2) Date: Nov. 17, 2014

(87) PCT Pub. No.: WO2013/172451
PCT Pub. Date: Nov. 21, 2013

(65) Prior Publication Data
US 2015/0155571 A1    Jun. 4, 2015

(30) Foreign Application Priority Data

May 17, 2012    (JP) ................. 2012-113501

(51) Int. Cl.
| | | |
|---|---|---|
| *H01M 8/02* | (2016.01) | |
| *H01M 8/0228* | (2016.01) | |
| *H01M 8/2425* | (2016.01) | |
| *H01M 8/0232* | (2016.01) | |
| *H01M 8/0245* | (2016.01) | |
| *H01M 8/0247* | (2016.01) | |
| *H01M 8/0208* | (2016.01) | |

(Continued)

(52) U.S. Cl.
CPC ....... *H01M 8/0228* (2013.01); *H01M 8/0208* (2013.01); *H01M 8/0215* (2013.01);
(Continued)

(58) Field of Classification Search
CPC . H01M 8/0215; H01M 8/0219; H01M 8/0228
(Continued)

(56) References Cited

U.S. PATENT DOCUMENTS

| | | |
|---|---|---|
| 8,617,769 B2 | 12/2013 | Ohmori et al. |
| 8,993,189 B2 | 3/2015 | Higashi et al. |

(Continued)

FOREIGN PATENT DOCUMENTS

| | | |
|---|---|---|
| CN | 102292859 A | 12/2011 |
| JP | H03119663 A | 5/1991 |

(Continued)

OTHER PUBLICATIONS

Saishin Setsudan Gijutsu Souran Editting Committee, Finish blanking method, Saishin Setsudan Gijutsu Souran, Mar. 20, 1985, line 17 (left column) to line 23 (right column) in p. 136, Kabushiki Kaisha Sangyo Gijutsu Service Center, Tokyo, Japan.

(Continued)

*Primary Examiner* — Basia Ridley
*Assistant Examiner* — James Erwin
(74) *Attorney, Agent, or Firm* — Viering, Jentschua & Partner mbB

(57) ABSTRACT

To provide a conductive member and a cell stack, where a concave groove of a conductive base substrate can be covered with a cover layer, as well as an electrochemical module and an electrochemical device.

9 Claims, 9 Drawing Sheets

(51) Int. Cl.
*H01M 8/0215* (2016.01)
*H01M 8/0256* (2016.01)
*H01M 8/124* (2016.01)

(52) U.S. Cl.
CPC ....... *H01M 8/0232* (2013.01); *H01M 8/0245* (2013.01); *H01M 8/0247* (2013.01); *H01M 8/0256* (2013.01); *H01M 8/2425* (2013.01); *H01M 2008/1293* (2013.01)

(58) Field of Classification Search
USPC .......................................................... 429/468
See application file for complete search history.

(56) References Cited

U.S. PATENT DOCUMENTS

| | | | |
|---|---|---|---|
| 9,065,084 | B2 | 6/2015 | Yasuda et al. |
| 2007/0099012 | A1 | 5/2007 | Brady et al. |
| 2011/0111327 | A1 | 5/2011 | Ohmori et al. |
| 2011/0281194 | A1 | 11/2011 | Higashi et al. |
| 2012/0177530 | A1 | 7/2012 | Yasuda et al. |

FOREIGN PATENT DOCUMENTS

| | | |
|---|---|---|
| JP | 2005339904 A | 12/2005 |
| JP | 2006172742 A | 6/2006 |
| JP | 2007019402 A | 1/2007 |
| JP | 2007291412 A | 11/2007 |
| JP | 2011099159 A | 5/2011 |
| JP | 2012014864 A | 1/2012 |
| WO | 2010087298 A1 | 8/2010 |
| WO | 2011034002 A1 | 3/2011 |

OTHER PUBLICATIONS

European Search Report issued in the corresponding European Patent Application No. 13790237.5, dated Dec. 23, 2015.
International Search Report dated Jul. 9, 2013 in the corresponding International Application No. PCT/JP2013/063796 filed May 17, 2013; 2 pages.

US 9,786,927 B2

CONDUCTIVE MEMBER, CELL STACK, ELECTROCHEMICAL MODULE, AND ELECTROCHEMICAL DEVICE

RELATED APPLICATIONS

The present application is a national stage entry according to 35 U.S.C. §371 of PCT application No.: PCT/JP2013/063796 filed on May 17, 2013, which claims priority from Japanese application No.: 2012-113501 filed on May 17, 2012, and is incorporated herein by reference in its entirety.

TECHNICAL FIELD

The present invention relates to a conductive member and a cell stack, where the surface of a conductive base substrate is covered with a cover layer, as well as an electrochemical module and an electrochemical device.

BACKGROUND ART

In recent years, a solid oxide fuel cell has been known as next-generation energy, wherein a fuel gas (hydrogen-containing gas) and an oxygen-containing gas (air or the like) are used and an electric power is generated at a high temperature of, for example, 600° C. to 1,000° C. In addition, a cell stack produced by electrically connecting a plurality of these fuel cells in series with collector members therebetween has been known (refer to, for example, PTL 1).

In PTL 1, a collector substrate, which is made from an alloy containing Cr and which has the surface covered with a cover layer to reduce diffusion of Cr, is used as the collector member because the collector member is required to have the heat resistance. The collector substrate is worked by, for example, cutting into a predetermined shape on the basis of a shear force by pressing. Thereafter, the surface of the collector substrate is covered with the cover layer by, for example, a dipping or sputtering method. Consequently, the collector member is constructed.

CITATION LIST

Patent Literature

PTL 1: Japanese Unexamined Patent Application Publication No. 2005-339904

SUMMARY OF INVENTION

Technical Problem

However, in previously known pressing of the collector substrate, a concave groove (crack) extending from the side surface of the collector substrate toward the inside may be generated because of a shear force generated in the collector substrate. It is difficult to form a cover layer all over the inside surface of the concave groove because an opening of this concave groove is large and deep. Therefore, an opening portion is present in the cover layer on the surface of the collector substrate on the basis of this concave groove, the collector substrate is oxidized, where this opening portion in the cover layer serves as a start point, and the heat resistance may be degraded.

It is an object of the present invention to provide a conductive member and a cell stack, where a concave groove of a conductive base substrate can be covered with a cover layer, as well as an electrochemical module and an electrochemical device.

Solution to Problem

A conductive member according to the present invention includes a conductive base substrate made from an alloy containing Cr and a cover layer covering the surface of the conductive base substrate with chromium oxide therebetween, wherein the above-described conductive base substrate includes a concave groove extending from the surface toward the inside, the above-described chromium oxide is filled in the concave groove, and the surface of the above-described chromium oxide filled in the above-described concave groove is covered with the above-described cover layer.

A cell stack according to the present invention includes a plurality of electrochemical cells electrically connected to each other with the above-described conductive members therebetween.

An electrochemical module according to the present invention includes the above-described cell stack in a storage container.

An electrochemical device according to the present invention includes the above-described electrochemical module and an accessory machine to operate the electrochemical module in an outer case.

Advantageous Effects of Invention

According to the conductive member of the present invention, the inside of the concave groove of the conductive base substrate is filled with chromium oxide, and the surface of the chromium oxide filled in the concave groove and the surface of the conductive base substrate is covered with the cover layer. Consequently, the concave groove of the conductive base substrate can be covered with the cover layer and degradation of the heat resistance due to the concave groove can be suppressed. Therefore, the long-term reliability can be improved by using such a conductive member for the cell stack, the electrochemical module, and the electrochemical device.

BRIEF DESCRIPTION OF DRAWINGS

FIG. 1A is a side view and FIG. 1B is a magnified sectional view showing part of FIG. 1A.

DESCRIPTION OF EMBODIMENTS

Figure 1A:
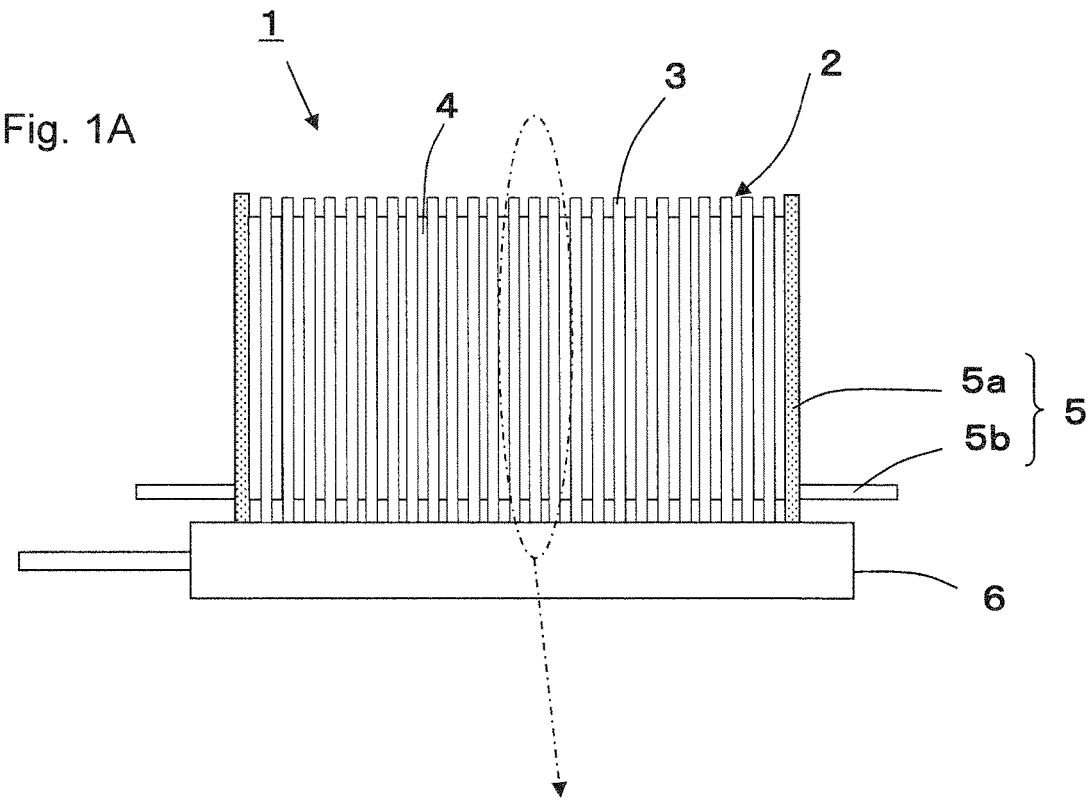
FIGS. 1A and 1B show diagrams of a cell stack device.

To begin with, a cell stack device including a fuel cell collector member as a conductive member will be described with reference to FIGS. 1A and 1B. A cell stack device 1 includes solid oxide fuel cells 3. This fuel cell 3 is provided with an overall columnar conductive support 7 having a gas flow channel 12 in the inside and having a pair of principal surfaces opposite to each other and a power generation portion in which a fuel electrode layer 8 serving as an inner electrode layer on one principal surface of the conductive support 7, a solid electrolyte layer 9, and an oxygen electrode layer 10 serving as an outer electrode layer are disposed in that order. An interconnector 11 is disposed on the other principal surface of the conductive support 7, so that the columnar (hollow flat board shaped) fuel cell 3 is constructed.

Then, a plurality of these fuel cells 3 are arranged in a row, a fuel cell collector member (conductive member) 4 (hereafter simply referred to as collector member 4) is disposed between adjacent fuel cells 3 and, thereby, a cell stack 2 is constructed, where fuel cells 3 are electrically connected to each other in series.

The fuel cell 3 and the collector member 4 are bonded with a conductive bonding material 13 therebetween, as described later in detail. Consequently, the cell stack 2 is constructed by electrically and mechanically bonding a plurality of fuel cells 3 to each other through the collector members 4.

A P-type semiconductor layer (not shown in the drawing) may also be disposed on the outer surface of the interconnector 11. The collector member 4 is connected to the interconnector 11 with the P-type semiconductor layer therebetween, so that contact between the two becomes ohmic contact and, thereby, potential drop can be reduced. This P-type semiconductor layer may also be disposed on the outer surface of the oxygen electrode layer 10.

The lower end portion of each of the fuel cells 3 constituting the cell stack 2 is fixed to a gas tank 6 with a seal material, e.g., glass (not shown in the drawing). Consequently, a fuel gas in the gas tank 6 can be fed to the fuel electrode layer 8 of the fuel cell 3 through the gas flow channel 12 in the fuel cell 3.

Figure 1B:
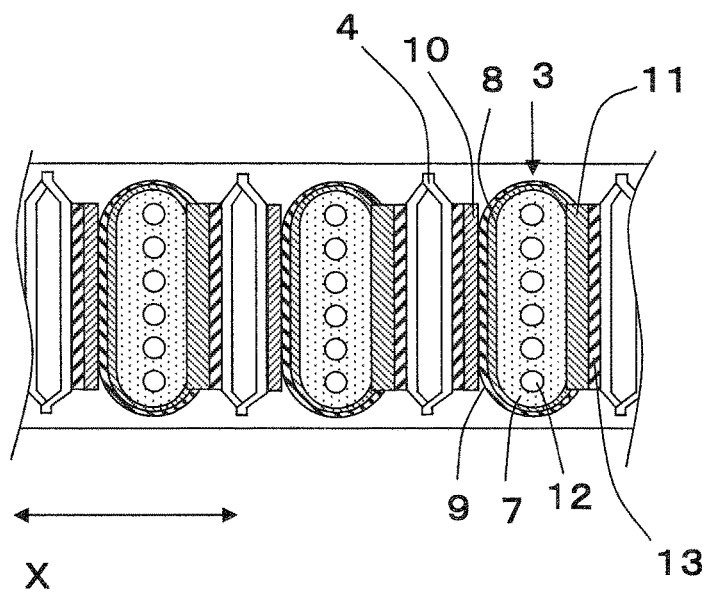
Figure 2:
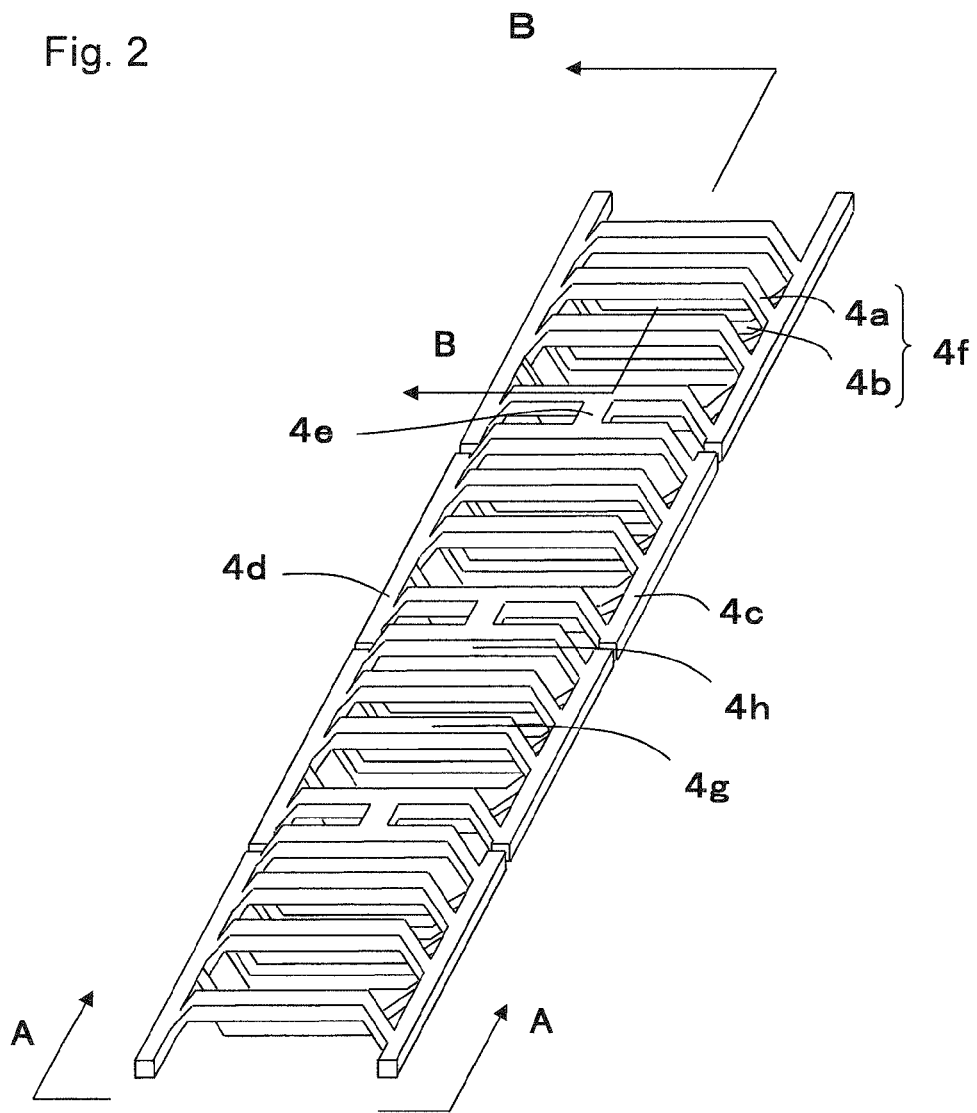
FIG. 2 shows a partial perspective view of a fuel cell collector member shown in FIGS. 1A and 1B.

The cell stack device 1 shown in FIGS. 1A and 1B has a configuration in which a hydrogen-containing gas serving as the fuel gas flows through the gas flow channel 12 of the fuel cell 3 and, in addition, an oxygen-containing gas (air) flows outside the fuel cell 3, in particular, through the inside space of the collector member 4 disposed between the fuel cells 3. Consequently, the fuel gas is fed from the gas tank 6 to the fuel electrode layer 8, the oxygen-containing gas is fed to the oxygen electrode layer 10 and, thereby, power generation of the fuel cell 3 is performed.

The cell stack device 1 has a configuration in which elastically deformable conductive sandwiching members 5 are disposed in such a way as to sandwich the cell stack 2 from both ends in the arrangement direction x of the fuel cells 3 with the collector members 4 therebetween. The lower end portions of the sandwiching members 5 are fixed to the gas tank 6. The sandwiching members 5 include flat board portions 5a disposed at both ends of the cell stack 2 and current lead portions 5b which have a shape extending along the arrangement direction x of the fuel cells 3 toward the outside and which lead the current generated by power generation of the cell stack 2 (fuel cells 3).

The individual members constituting the fuel cell 3 shown in FIGS. 1A and 1B will be described below.

As for the fuel electrode layer 8, commonly known materials can be used and the fuel electrode layer 8 can be formed from a porous conductive ceramics, e.g., $ZrO_2$ containing a rare earth element oxide as a solid solution (referred to as stabilized zirconia), and Ni and/or NiO.

The solid electrolyte layer 9 is required to have a function as an electrolyte to serve as a bridge between electrodes in terms of electrons and, at the same time, have gas barrier properties to prevent leakage of the fuel gas and the oxygen-containing gas and is formed from $ZrO_2$ containing 3 to 15 percent by mole of rare earth element (rare earth element oxide) as a solid solution. In this regard, the solid electrolyte layer 9 may be formed from other materials and the like insofar as the above-described characteristics are provided.

The oxygen electrode layer 10 can be formed from a commonly used material, for example, conductive ceramics made from a so-called $ABO_3$ perovskite compound oxide, without specific limitation. It is necessary that the oxygen electrode layer 10 have gas permeability and the open porosity can be 20% or more, and in particular within the range of 30% to 50%. As for the oxygen electrode layer 10, for example, at least one type of lanthanum manganite ($LaSrMnO_3$), lanthanum ferrite ($LaSrFeO_3$), lanthanum cobaltite ($LaSrCoO_3$), and the like, where Mn, Fe, Co, or the like is present in B site, can be used.

The interconnector 11 can be formed from conductive ceramics and needs to have the reduction resistance and the oxidation resistance because of contact with the fuel gas (hydrogen-containing gas) and the oxygen-containing gas (air or the like), so that lanthanum chromite ($LaCrO_3$) can be used. It is necessary that the interconnector 11 be dense to prevent leakage of the fuel gas passing through the plurality of gas flow channels 12 in the conductive support 7 and the oxygen-containing gas passing outside the conductive support 7. Preferably, the relative density is 93% or more, and in particular 95% or more.

The conductive support 7 is required to have the gas permeability to pass the fuel gas to the fuel electrode layer 8 and, in addition, the electrical conductivity to collect currents through the interconnector 11. Therefore, it is necessary that a material satisfying such a requirement be used for the conductive support 7, and conductive ceramics, cermet, and the like can be used, for example.

Meanwhile, in production of the fuel cell 3, in the case where the conductive support 7 is produced by co-firing with the fuel electrode layer 8 or the solid electrolyte layer 9, the conductive support 7 can be formed from an iron group metal component and a specific rare earth element oxide. In order to provide the gas permeability, the conductive support 7 favorably has an open porosity of 30% or more, and in particular within the range of 35% to 50%, and the electrical conductivity thereof may be 50 S/cm or more, 300 S/cm or more, or furthermore 440 S/cm or more.

Examples of P-type semiconductor layer (not shown in the drawing) can include a layer formed from a transition metal perovskite oxide. Specifically, a material having the electron conductivity larger than the electron conductivity of lanthanum chromite constituting the interconnector 11, for example, P-type semiconductor ceramics made from at least one type of lanthanum manganite ($LaSrMnO_3$), lanthanum ferrite ($LaSrFeO_3$), lanthanum cobaltite ($LaSrCoO_3$), and the like, where Mn, Fe, Co, or the like is present in B site, can be used. The thickness of such a P-type semiconductor layer is preferably within the range of 30 to 100 μm in general.

The conductive bonding material 13 connects the fuel cell 3 to the collector member 4 and can be formed by using the conductive ceramics or the like. The same conductive ceramics as that constitutes the oxygen electrode layer 10 can be used. It is preferable that the conductive bonding material 13 be formed from the same components as the components of the oxygen electrode layer 10, because the bonding strength between the oxygen electrode layer 10 and the conductive bonding material 13 is enhanced.

Specifically, $LaSrFeO_3$, $LaSrMnO_3$, $LaSrCoO_3$, and the like can be used. The conductive bonding material 13 may be produced by using a single material among these materials or by combining at least two types.

The conductive bonding material 13 may be formed from different types of materials having different particle diameters or be formed from different types of materials having the same particle diameter. Furthermore, the conductive bonding material 13 may be formed from the same type of materials having different particle diameters or be formed from the same type of materials having the same particle diameter. In the case where different particle diameters are employed, preferably, the diameter of fine particle is specified to be 0.1 to 0.5 μm, and the diameter of coarse particle is specified to be 1.0 to 3.0 μm. In the case where the conductive bonding material 13 is formed by employing the same particle diameter, preferably, the particle diameter is specified to be 0.5 to 3 μm.

The conductive bonding material 13 is produced by using materials having different particle diameters, as described above, so that coarse particles having a large particle diameter can enhances the strength of the conductive bonding material 13 and, in addition, fine particles having a small particle diameter can improve the sinterability of the conductive bonding material 13.

Next, the collector member 4 will be described with reference to FIGS. 2, 3A, 3B, and 4A to 4D. In the collector member 4 shown in FIG. 2, one set of unit includes a plurality of first collector pieces 4a each bonded to one of adjacent fuel cells 3, a plurality of second collector pieces 4b each bonded to the other of adjacent fuel cells 3, a first connection portion 4c to connect one end of each of the plurality of first collector pieces 4a and one end of each of the plurality of second collector pieces 4b, and a second connection portion 4d to connect the other end of each of the plurality of first collector pieces 4a and the other end of each of the plurality of second collector pieces 4b. Then, a plurality of sets of the units are connected to each other with conductive connection pieces 4e in the longitudinal direction of the fuel cell 3, so that the collector member 4 is constructed. The first collector piece 4a and the second collector piece 4b show the regions to be bonded to the fuel cell 3, and these regions serve as collector portions 4f to take out an electric power by the fuel cell 3. The space between the first collector pieces 4a and the second collector pieces 4b is specified to be a space through which the oxygen-containing gas passes.

In the fuel cell 3, as described above, the region in which the fuel electrode layer 8 is opposed to the oxygen electrode layer 10 with the solid electrolyte layer 9 therebetween serves as a power generation portion. Therefore, in order to collect the current generated in the power generation portion of the fuel cell 3 efficiently, the length of the collector member 4 along the longitudinal direction of the fuel cell 3 is favorably specified to be more than or equal to the length of the oxygen electrode layer 10 in the fuel cell 3 in the longitudinal direction. The structure of the collector member 4 is not limited to this.

The collector member 4 is exposed to a high-temperature oxidizing atmosphere when the cell stack device 1 is operated and, therefore, is constructed by forming a cover layer 43 all over the surface of a collector substrate (conductive base substrate) 41. Consequently, degradation of the collector member 4 can be reduced. In this regard, in FIG. 2 and FIG. 3A, the cover layer 43 is omitted, and FIGS. 4A to 4D show the state in which the cover layer 43 is formed all over the surface of the collector substrate 41, where oblique lines indicating the cross section of the collector substrate 41 are omitted.

The collector member 4 is required to have the heat resistance and the electrical conductivity in a high-temperature oxidizing atmosphere, so that the collector substrate 41 can be produced from, for example, an alloy. In particular, the collector member 4 is exposed to a high-temperature oxidizing atmosphere and, therefore, the collector substrate 41 is formed from an alloy containing Cr at a proportion of 4 to 30 percent by mass. The collector substrate 41 can be formed from, for example, Fe—Cr based alloys, Ni—Cr based alloys, and the like. The collector substrate 41 is a conductive base substrate for high temperatures (600° C. to 1,000° C.).

In order to reduce diffusion of Cr in the collector substrate 41 into the fuel cell 3, an oxide of Zn, a perovskite compound oxide containing La and Sr, or the like can be used as the cover layer 43. The cover layer 43 may be a material other than the above-described material insofar as diffusion of Cr is reduced.

Figure 3A:
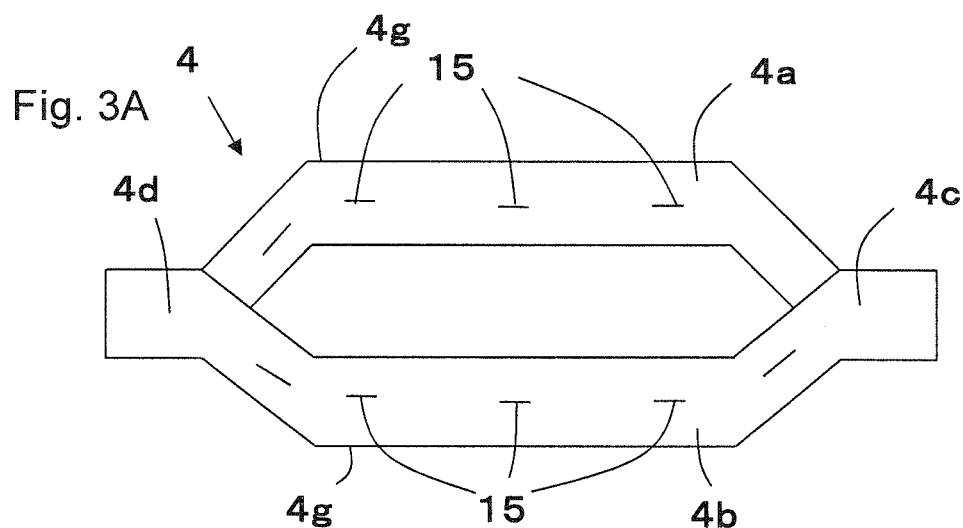
FIG. 3A is a side view of the fuel cell collector member, viewed along a line A-A shown in FIG. 2
Figure 3B:
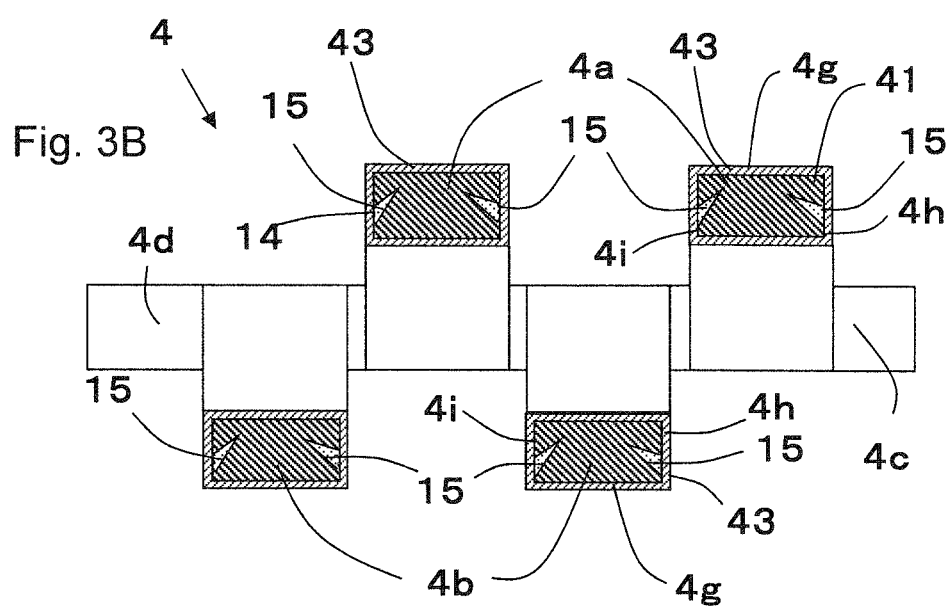
FIG. 3B is a sectional view of a section of the fuel cell collector member, taken along a line B-B shown in FIG. 2.

As shown in FIGS. 3A and 3B, each of the first collector piece 4a and the second collector piece 4b has a first surface 4g intersecting the arrangement direction x of the fuel cells 3 and a second surface 4h and a third surface 4i formed parallel to the arrangement direction x of the fuel cells 3. Put another way, the first surface 4g opposite to the fuel cell 3 and the second surface 4h and the third surface 4i on the both sides adjoining the first surface 4g are provided. The second surface 4h and the third surface 4i are the side surfaces of the collector substrate 41.

A plurality of concave grooves 15 are disposed in the second surfaces 4h and the third surfaces 4i of the first collector piece 4a and the second collector piece 4b, and chromium oxide 14 is filled in these concave grooves 15. Put another way, crack-shaped concave grooves 15 are disposed in the surfaces (side surfaces) cut by the shear force during pressing and, thereby, formed in the thickness direction, and chromium oxide 14 is filled in these concave grooves 15. This chromium oxide 14 is formed by oxidizing Cr diffused from the inside of the collector substrate 41 to the surface of the concave grooves 15 of the collector substrate 41 during a heat treatment of the collector substrate 41.

Figure 4A:
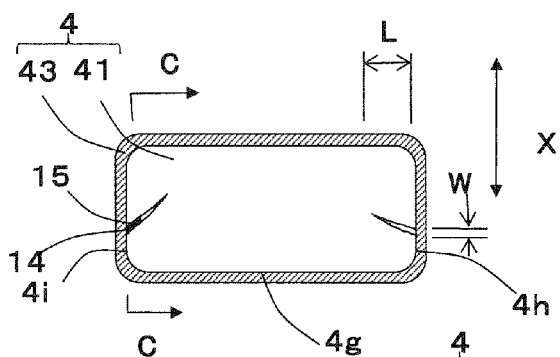
FIG. 4A is a magnified sectional view illustrating a collector piece of the fuel cell collector member shown in FIG. 3 B.
Figure 4B:
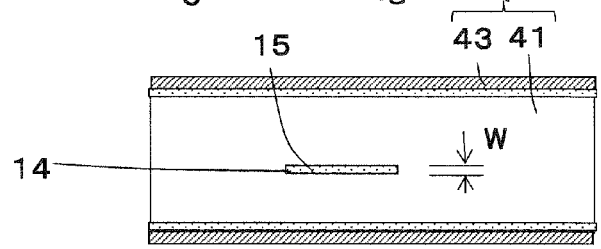
FIG. 4B is a sectional view of a section taken along a line C-C shown in FIG. 4A.
Figure 4C:
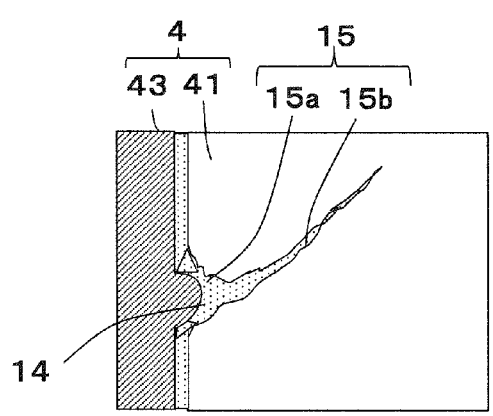
FIG. 4C is a magnified sectional view of a concave groove portion shown in FIG. 4A.

As shown in FIG. 3B and FIG. 4C, the concave grooves 15 are almost closed to such an extent that inner wall surfaces in the thickness direction (arrangement direction x) of the collector substrate 41 come into contact with each other, and even when the concave groove 15 is opened, the space is in the shape of a sheet having a small thickness W, the inside is formed having a tapered shape, and the chromium oxide 14 is almost filled in the concave groove 15, so that the concave grooves 15 is almost filled with the chromium oxide 14.

Explanations will be made with reference to FIG. 4C. In a cross section in the thickness direction of the collector substrate 41 (in cross-sectional view of the collector substrate 41), the concave groove 15 is provided with a concave portion 15a which is formed in the side-surface side of the collector substrate 41 and which has a large thickness and a crack 15b which is extended linearly from the concave portion 15a toward the inside of the collector substrate 41 and which has a thickness smaller than the thickness of the concave portion 15a, wherein the surface of the chromium oxide 14 filled in the concave portion 15a is dented and part of the surface on the chromium oxide 14 side of the cover layer 43 digs into the dented portion. The cover layer 43 covers all over the surface of the chromium oxide 14 in the concave portion 15a.

Figure 4D:
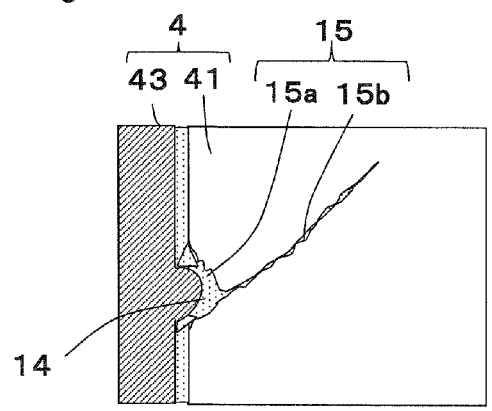
FIG. 4D is a magnified sectional view in the case where the thickness of the concave groove is decreased by increasing the pressing pressure as compared with that in the case shown in FIG. 4C.

As shown in FIG. 4D, the chromium oxide 14 may be filled in the sheet-shaped space closed to such an extent that opposite inner wall surfaces of the concave groove 15 come into contact with each other, and a plurality of blocks of chromium oxide 14 may seem to dot in a line in a cross section of the collector substrate 41 in the thickness direction. Each of the blocks of the chromium oxide 14 seems to be in the shape of an ellipse or a bar rather than the shape of a sphere in cross-sectional view of the collector substrate 41 in the thickness direction.

The structure shown in FIG. 4D can be achieved by increasing the applied pressure in pressing as compared with the pressure in the case shown in FIG. 4C. In a cross section in the thickness direction of the collector substrate 41, the chromium oxide 14 in the concave groove 15 is configured to be present in the concave portion 15a which is formed in the side-surface side of the collector substrate 41 and, in addition, dot linearly from the concave portion 15a toward the inside of the collector substrate 41. The surface of the chromium oxide 14 filled in the concave portion 15a is dented and part of the surface on the chromium oxide 14 side of the cover layer 43 digs into the dented portion. The cover layer 43 covers all over the surface of the chromium oxide 14 in the concave portion 15a.

Linear dotting toward the inside of the collector substrate 41 may be in the shape a straight line or a curved line. The inner wall surfaces constituting the concave groove 15 are almost closed to such an extent that the inner wall surfaces come into contact with each other, and in these almost closed portions, it seems that the chromium oxide 14 is not present or blocks of chromium oxide 14 dot.

The material constituting the cover layer 43 is not disposed in the concave groove 15 which is 20 μm or more deep from the side surface of the collector substrate 41. That is, chromium oxide 14 is present in the concave groove 15 which is 20 μm or more deep from the side surface of the collector substrate 41, and the cover layer 43 covers all over the surface of the chromium oxide 14 in the concave portion 15a in the concave groove 15. In this regard, the term "20 μm or more deep from the side surface of the collector substrate 41" refers to 20 μm or more deep from the straight line bonding the side surfaces upper and under the concave groove 15 of the collector substrate 41 in the cross section of the collector substrate 41 in the thickness direction.

In FIGS. 4A to 4D, the concave grooves 15 are disposed obliquely from the second surface 4h and the third surface 4i constituting the side surfaces of the collector substrate 41 toward the side opposite to the first surface 4g.

The concave groove 15 is disposed having a depth from the second surface 4h and the third surface 4i of the collector portion 4f toward the inside of 5 to 30 μm (L shown in FIG. 4A). The concave portion 15a of the concave groove 15 is closed or is opened while the thickness (opening width: W shown in FIGS. 4A and 4B) is specified to be 1 to 5 μm. Consequently, chromium oxide 14 is filled in easily, the concave groove 15 of the collector substrate 41 can be covered with the cover layer 43, and all over the surface of the collector substrate 41 can be covered with the cover layer 43 without a gap, as described later. Therefore, oxidation of the collector member 4 from the concave groove 15 is suppressed and the heat resistance can be improved.

Peeling of the cover layer 43 from the collector substrate 41 can be suppressed because the thermal expansion coefficient decreases in the order of the collector substrate 41, the chromium oxide 14, and the cover layer 43 and a material constituting the chromium oxide 14 is present in the concave groove 15 as well.

Figure 5A:
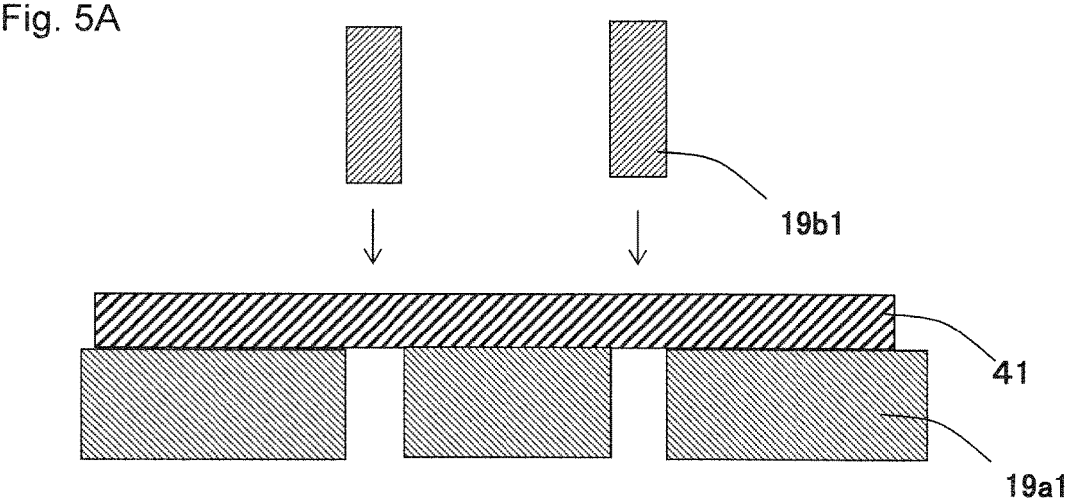
FIGS. 5A to 5C show explanatory diagrams illustrating the first half of a production process of the fuel cell collector member.
Figure 5B:
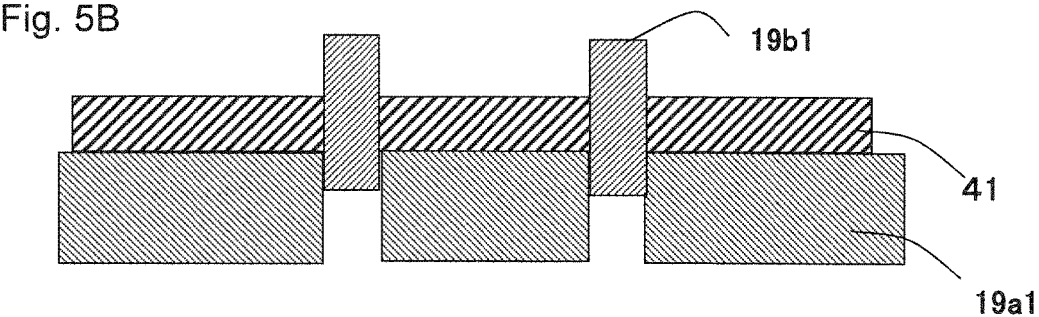
Figure 5C:
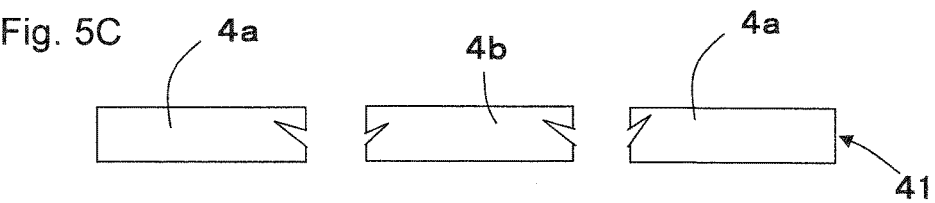

Next, a method for producing the collector member 4 will be described. As shown in FIG. 5A, a rectangular board-shaped collector substrate 41 having a thickness of 0.1 to 1 mm is placed on a lower die 19a1 of a pressing machine provided with the lower die 19a1 and an upper die 19b1. Thereafter, as shown in FIG. 5B, slits extending in the width direction of the collector substrate 41 are formed by moving down the upper die 19b1. The upper die 19b1 having the shape to form the slit is inserted into a hole of the lower die 19a1, from which the slit portion has been hollowed out, so that slits are formed in the collector substrate 41 by a shear force. At this time, as shown in FIG. 5C, wedge-shaped concave grooves 15 may be formed obliquely in the side surfaces of the collector substrate 41 (the second surfaces 4h and the third surfaces 4i of the first collector piece 4a and the second collector piece 4b) by the shear force.

Figure 5D:
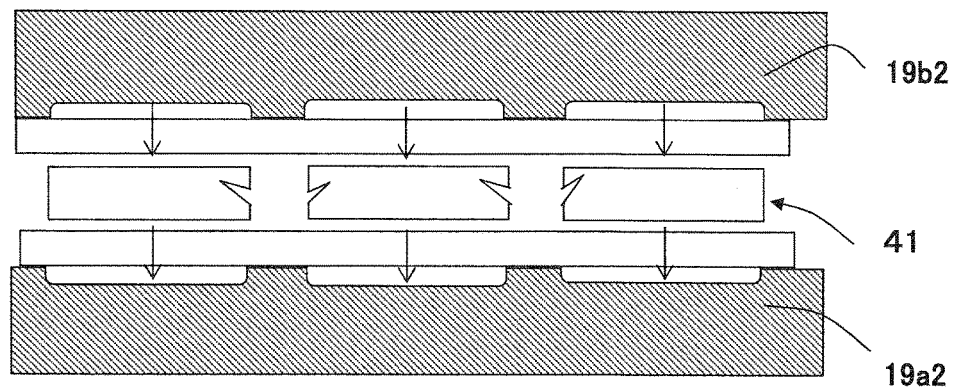
FIGS. 5D to 5G show explanatory diagrams illustrating the second half of the production process of the fuel cell collector member.
Figure 5E:
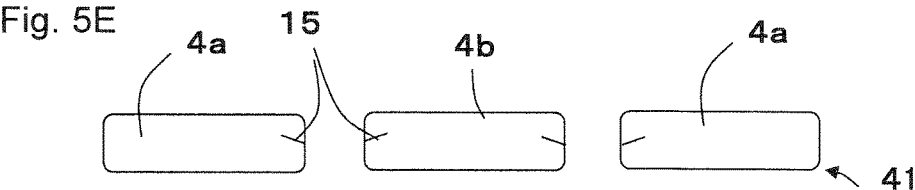

Then, as shown in FIG. 5D, the principal surface side of the collector substrate 41 is pressed by sandwiching with a lower die 19a2 and an upper die 19b2, so that as shown in FIG. 5E, the opening portion of the wedge-shaped concave groove 15 is narrowed and the crack-shaped concave groove 15 having a small thickness can be produced. That is, the concave groove 15 formed by the shear force has the concave portion 15a, which is an opening having a large thickness to some extent, on the side-surface side of the collector substrate 41 and a small cleavage-shaped crack 15b, which has a thickness smaller than the thickness of the concave portion 15a, from the concave portion 15a toward the inside. At this time, the corner portions of the collector substrate 41 can be rounded by pressurizing with the lower die 19a2 and the upper die 19b2, which round the corner portions of the collector substrate 41, so that the cover layer 43 can be formed on these portions easily.

Figure 5F:
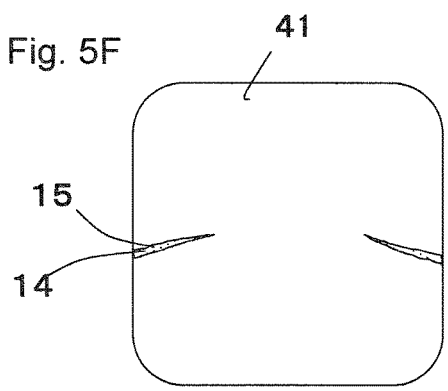

Subsequently, the collector substrate 41 is, for example, heat-treated in the air at 500° C. to 1,000° C. for 0.5 to 5 hours, so that layered chromium oxide 14 is formed on the surface of the collector substrate 41 and, in addition, as shown in FIG. 5F, the chromium oxide 14 is deposited on the inside surface of the concave groove 15 and the inside of the concave groove 15 is filled with the chromium oxide 14. In this regard, the degree of filling of the concave groove 15 with the chromium oxide 14 can be controlled by the heat treatment condition of the collector substrate 41. That is, if the dimension of the concave groove 15 is the same, chromium can be diffused from the collector substrate 41 to the surface of the collector substrate 41, more chromium oxide 14 can be formed, and the chromium oxide 14 can be filled into the concave groove 15 by increasing the heat treatment temperature or by increasing the heat treatment time.

Also, the thickness of the concave groove 15 can be adjusted by adjusting the pressure applied with the lower die 19a2 and the upper die 19b2 shown in FIG. 5D. That is, the thickness of the concave groove 15 can be decreased, the concave groove 15 can be filled with the chromium oxide 14 easily, and the structure shown in, for example, FIG. 4D can be established by increasing the pressing pressure. The pressing pressure can be specified to be, for example, 1 to 100 kg/mm$^2$.

It is possible that the concave groove 15 is not completely filled with the chromium oxide 14 and the chromium oxide 14 is formed in such a way as to be slightly dented from the surface of the concave groove 15 of the collector substrate 41 by controlling the pressure applied with the lower die 19a2 and the upper die 19b2 and controlling the heat treatment condition. In this configuration, the material constituting the cover layer 43 is disposed in the dent of the chromium oxide 14, and peeling of the cover layer 43 from the collector substrate 41 can be suppressed. Also, it is possible to form the chromium oxide 14 to almost equal position of the surface of the collector substrate 41 or form the chromium oxide 14 in such a way as to slightly protrude from the surface of the collector substrate 41 by controlling the pressure applied with the lower die 19a2 and the upper die 19b2 and controlling the heat treatment condition.

Figure 5G:
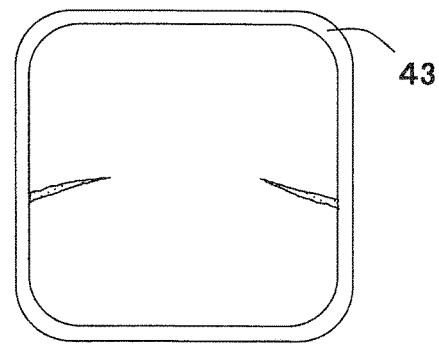

Thereafter, as shown in FIG. 5G, the collector member 4 can be constructed by forming the cover layer 43 on the surface of the collector substrate 41 (in detail, the surface of the chromium oxide 14) and the surface of the chromium oxide 14 filled in the concave groove 15 by, for example, a sputtering method.

In the case where the opening portion of the concave groove 15 is wide and shallow, the thickness of the opening portion is hardly decreased by pressurizing the principal surface of the collector substrate 41. However, the chromium oxide 14 in the concave groove 15 can be covered with the cover layer 43 by the sputtering method or the like because the opening portion is wide. Conversely, in the case where the opening portion of the concave groove 15 is wide and deep, the thickness of the deep portion side of the concave groove 15 is decreased by pressing, the chromium oxide 14 is filled in, and as for the opening portion of the concave groove 15, the chromium oxide 14 in the concave groove 15 can be covered with the cover layer 43 by the sputtering method or the like. Meanwhile, in the case where the opening portion of the concave groove 15 is narrow, the opening portion of the concave groove 15 can be covered with the cover layer 43.

In this regard, FIG. 5C and FIGS. 5D to 5G are sectional views, although oblique lines in the collector substrate 41 and the cover layer 43 are omitted. The chromium oxide 14 is formed all over the surface of the collector substrate 41, although in FIGS. 5F and 5G, only the chromium oxide 14 in the concave groove 15 is described.

In the step shown in FIG. 5D, the corner portions of the collector substrate 41 can be rounded, so that the cover layer can be formed all around the collector substrate 41 easily, as shown in FIGS. 5E) to 5G.

Next, the state of bonding between the collector member 4 and the fuel cell 3 with the conductive bonding material 13 therebetween will be described with reference to FIG. 6.

Figure 6:
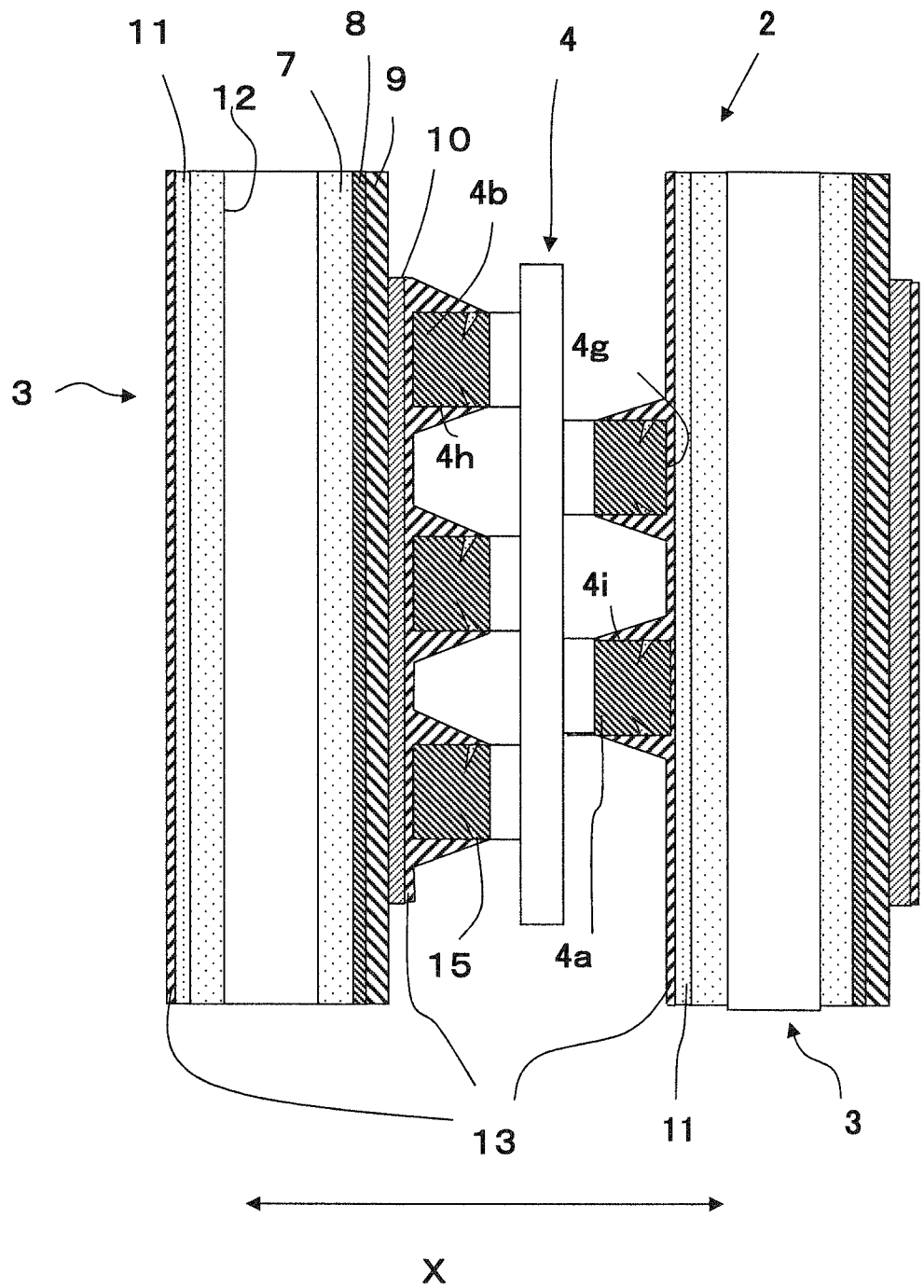
FIG. 6 is a vertical sectional view illustrating the bonding state between the fuel cell and the fuel cell collector member in the cell stack device shown in FIGS. 1A and 1B.

As shown in FIG. 6, the collector member 4 and the fuel cell 3 are bonded to each other with the conductive bonding material 13 therebetween. That is, the collector member 4 and the fuel cell 3 are electrically and mechanically connected to each other with the conductive bonding material 13 therebetween. The conductive bonding material 13 is disposed in such a way as to cover the first surface 4g, the second surface 4h, and the third surface 4i of the collector portion 4f, and the conductive bonding material 13 located on each of the second surface 4h and the third surface 4i is disposed in such a way that the amount increases with increasing proximity to the fuel cell 3 bonded. Alternatively, the conductive bonding material 13 may be disposed in such a way as to completely cover the collector portion 4f by covering all around the collector member 4. In FIG. 6, description of the cover layer 43 is omitted.

That is, in FIG. 6, the conductive bonding material 13 is disposed to bond the fuel cell 3 to the collector member 4 and is disposed all over the oxygen electrode layer 10 on the oxygen electrode layer 10 side of the fuel cell 3. The conductive bonding material 13 is disposed all over the interconnector 11 on the interconnector 11 side of the fuel cell 3. In this regard, the collector member 4 may be bonded to the fuel cell 3 by disposing the conductive bonding material 13 on part of the oxygen electrode layer 10 and the interconnector 11.

Next, a fuel cell module 20 in which the cell stack device 1 is in a storage container 21 will be described with reference to FIG. 7.

Figure 7:
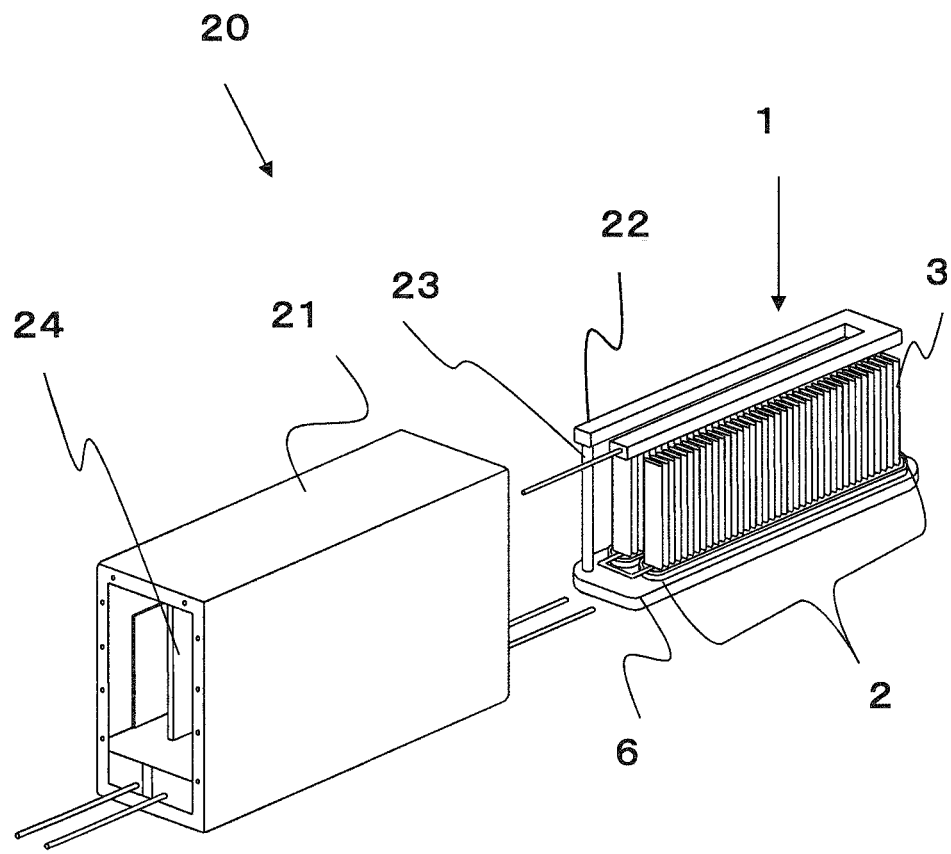
FIG. 7 shows an exploded outline perspective view of a fuel cell module including the cell stack device shown in FIGS. 1A and 1B in a storage container.

The fuel cell module 20 shown in FIG. 7 is constructed by disposing a reformer 22, which generates a fuel gas by reforming a raw fuel, e.g., a natural gas or kerosene, to obtain the fuel gas to be used in the fuel cell 3, above the cell stack 2. The fuel gas generated in the reformer 22 is fed to the gas tank 6 through a gas flow pipe 23 and is fed from the gas tank 6 to the gas flow channel 12 in the fuel cell 3.

FIG. 7 shows the state in which part of the storage container 21 (front and rear panels) is detached and the cell stack device 1 and the reformer 22 in the inside are taken out backward. Here, in the fuel cell module 20 shown in FIG. 7, the cell stack device 1 can be accommodated by being slid into the storage container 21.

In FIG. 7, an oxygen-containing gas introduction member 24 in the storage container 21 is disposed between a pair of cell stacks 2 placed side by side on the gas tank 6 and, in addition, is configured to feed the oxygen-containing gas to the lower end portion side of the fuel cell 3 in such a way that the oxygen-containing gas flows through the side of the fuel cell 3 from the lower end portion side toward the upper end portion side along with the flow of the fuel gas. Then, an excess fuel gas (fuel off gas) not used for power generation and discharged from the gas flow channel 12 of the fuel cell 3 is burnt above the upper end portion of the fuel cell 3 and, thereby, the temperature of the cell stack 2 can be raised effectively, so that startup of the cell stack device 1 can be hastened. Also, the fuel gas not used for power generation and discharged from the gas flow channel 12 of the fuel cell 3 is burnt above the upper end portion of the fuel cell 3 and, thereby, the reformer 22 above the cell stack 2 can be warmed. Consequently, the reforming reaction can be induced in the reformer 22 efficiently.

Next, a fuel cell device 25 in which the fuel cell module 20 and an accessory machine (not shown in the drawing) to operate the fuel cell module 20 are in an outer case will be described with reference to FIG. 8.

Figure 8:
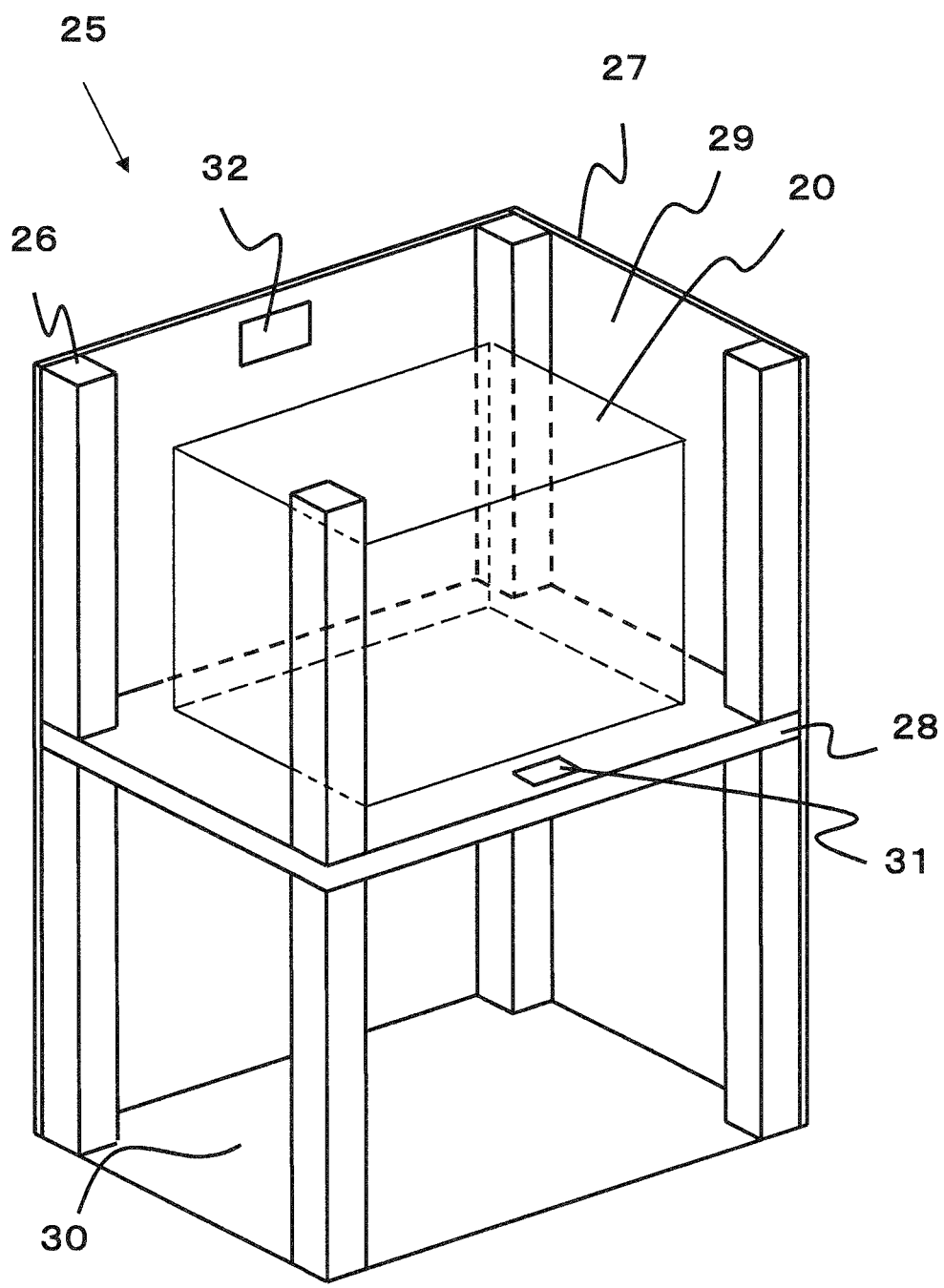
FIG. 8 shows a perspective view of a fuel cell device including the fuel cell module shown in FIG. 7 in an outer case.

The fuel cell device 25 shown in FIG. 8 has a configuration in which the inside of the outer case formed from support columns 26 and facing boards 27 is divided into upper and lower parts by a partition board 28, the upper side is specified to be a module storage chamber 29 to accommodate the above-described fuel cell module 20, and the lower side is specified to be an accessory machine storage chamber 30 to accommodate the accessory machine to operate the fuel cell module 20. In this regard, the accessory machine in the accessory machine storage chamber 30 is omitted.

The partition board 28 is provided with an air flow hole 31 to pass the air in the accessory machine storage chamber 30 to the module storage chamber 29 side and an exhaust vent 32 to exhaust the air in the module storage chamber 29 is disposed in part of the facing board 27 constituting the module storage chamber 29.

Up to this point, the present invention has been explained in detail. However, the present invention is not limited to the above-described embodiments and various modifications, improvements, and the like can be made within the bounds of not departing from the gist of the present invention.

For example, in the above-described embodiments, the fuel cell collector member 4 of the cell stack device 1 is explained as the conductive member according to the present invention. However, the application of the conductive member according to the present invention is not limited to the fuel cell and it is possible to use for applications in a high-temperature oxidizing atmosphere, for example, a conductive member for an oxygen sensor.

In the above-described embodiments, the fuel cell, the fuel cell module, and the fuel cell device are explained. However, the present invention is not limited to them and can also be applied to an electrolysis cell (SOEC) to generate hydrogen and oxygen ($O_2$) by applying a water vapor and a voltage to the electrolysis cell and electrolyzing the water vapor (water) and an electrolysis module and an electrolysis device including the electrolysis cell.

REFERENCE SIGNS LIST

1 cell stack device
2 cell stack
3 fuel cell
4 collector member
6 gas tank
13 conductive bonding material
14 chromium oxide
15 concave groove
15*a* concave portion
15*b* crack
20 fuel cell module
21 storage container
25 fuel cell device
41 collector substrate
43 cover layer

The invention claimed is:

1. A conductive member comprising:
    a conductive base substrate comprising an alloy containing Cr;
    a chromium oxide covering the conductive base substrate; and
    a cover layer covering the chromium oxide,
    wherein the conductive base substrate comprises a concave groove extending from the surface toward the inside, the chromium oxide is filled in the concave groove, and
    the surface of the chromium oxide is covered with the cover layer in the concave groove; and
    wherein the concave groove comprises:
        a concave portion present on the surface side of the conductive base substrate; and
        a crack extending linearly from the concave portion toward the inside of the conductive base substrate in cross-sectional view of the conductive base substrate.

2. The conductive member according to claim 1, wherein the chromium oxide is filled in the concave portion and the crack.

3. The conductive member according to claim 1, wherein the surface of the chromium oxide is dented in the concave portion, and
    a part of the cover layer digs into the dented portion.

4. The conductive member according to claim 1, wherein the chromium oxide extends linearly in the crack in cross-sectional view of the conductive base substrate.

5. The conductive member according to claim 1, wherein the chromium oxide comprises dots located linearly in the crack in cross-sectional view of the conductive base substrate.

6. The conductive member according to claim 3, wherein no material constituting the cover layer is present in the concave groove 20 μm or more inside from the surface of the conductive base substrate.

7. A cell stack comprising a plurality of electrochemical cells electrically connected to each other with the conductive members according to claim 1 therebetween.

8. An electrochemical module comprising the cell stack according to claim 7 in a storage container.

9. An electrochemical device comprising the electrochemical module according to claim 8 and an accessory machine to operate the electrochemical module in an outer case.

* * * * *